(12) United States Patent
Jeon et al.

(10) Patent No.: US 9,087,644 B2
(45) Date of Patent: Jul. 21, 2015

(54) MULTILAYER CERAMIC ELECTRONIC COMPONENT AND FABRICATION METHOD THEREOF

(75) Inventors: Byung Jun Jeon, Gyunggi-do (KR); Kyu Ha Lee, Gyunggi-do (KR); Hyun Hee Gu, Gyunggi-do (KR); Chang Hoon Kim, Gyunggi-do (KR); Myung Jun Park, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 148 days.

(21) Appl. No.: 13/620,663

(22) Filed: Sep. 14, 2012

(65) Prior Publication Data

US 2013/0182369 A1    Jul. 18, 2013

(30) Foreign Application Priority Data

Jan. 18, 2012  (KR) .................. 10-2012-0005751

(51) Int. Cl.
| | |
|---|---|
| H01G 4/232 | (2006.01) |
| H01G 4/30 | (2006.01) |
| H01G 4/228 | (2006.01) |
| H01G 4/12 | (2006.01) |

(52) U.S. Cl.
CPC ............ *H01G 4/232* (2013.01); *H01G 4/2325* (2013.01); *H01G 4/30* (2013.01); *H01G 4/12* (2013.01); *H01G 4/228* (2013.01)

(58) Field of Classification Search
None
See application file for complete search history.

(56) References Cited

U.S. PATENT DOCUMENTS

| | | | |
|---|---|---|---|
| 2009/0310277 A1* | 12/2009 | Kayatani et al. ........... | 361/306.3 |
| 2009/0323253 A1* | 12/2009 | Kobayashi et al. ........ | 361/301.4 |
| 2011/0122540 A1* | 5/2011 | Ogawa et al. ............... | 361/305 |
| 2011/0235233 A1* | 9/2011 | Ando et al. ................. | 361/301.4 |

FOREIGN PATENT DOCUMENTS

| | | |
|---|---|---|
| JP | 06-224073 A | 8/1994 |
| JP | 2008-112759 A | 5/2008 |

* cited by examiner

*Primary Examiner* — Dion R Ferguson
(74) *Attorney, Agent, or Firm* — McDermott Will & Emery LLP

(57) ABSTRACT

A multilayer ceramic electronic component includes: a ceramic main body; a plurality of internal electrodes laminated within the ceramic main body; and external electrodes formed on outer surfaces of the ceramic main body and electrically connected to the internal electrodes, wherein an average thickness of the external electrodes is 10 μm or less, and when a thickness of the external electrodes in a central portion of the ceramic main body in a width direction is Tc and a thickness of the external electrodes at a lateral edge of a printed surface region of the internal electrodes is T1, $0.5 \leq |T1/Tc| \leq 1.0$ is satisfied.

17 Claims, 3 Drawing Sheets

MULTILAYER CERAMIC ELECTRONIC COMPONENT AND FABRICATION METHOD THEREOF

CROSS-REFERENCE TO RELATED APPLICATIONS

This application claims the priority of Korean Patent Application No. 10-2012-0005751 filed on Jan. 18, 2012, in the Korean Intellectual Property Office, the disclosure of which is incorporated herein by reference.

BACKGROUND OF THE INVENTION

1. Field of the Invention

The present invention relates to a high capacitance multilayer ceramic electronic component having excellent reliability, while having thinned external electrodes, by reducing thickness deviations in the external electrodes.

2. Description of the Related Art

Recently, as electronic products have been reduced in size, multilayer ceramic electronic components have also been required to be reduced in size, yet have a large capacity.

Thus, various methods have been attempted to make dielectric layers and internal electrodes thinner and increasingly multilayered, and recently, multilayered ceramic electronic components in which an increased amount of thinned dielectric layers are laminated have been fabricated.

In addition, since external electrodes have also been required to be thinned, potentially causing a problem in which a plating solution infiltrates into a chip therethrough, it is difficult to reduce the size of the multilayer ceramic electronic component.

In particular, when the thickness of external electrodes is not uniform, the possibility of the plating solution infiltrating a thinner portion thereof is further increased, resulting in a failure to secure reliability.

Thus, in a case in which a high capacitance product is small, the shape of external electrodes thereof is of critical importance.

SUMMARY OF THE INVENTION

An aspect of the present invention provides a high capacitance multilayer ceramic electronic component having excellent reliability, while having thinned external electrodes, by reducing thickness deviations in the external electrodes.

According to an aspect of the present invention, there is provided a multilayer ceramic electronic component including: a ceramic main body; a plurality of internal electrodes laminated within the ceramic main body; and external electrodes formed on outer surfaces of the ceramic main body and electrically connected to the internal electrodes, wherein an average thickness of the external electrodes is 10 µm or less, and when a thickness of the external electrodes in a central portion of the ceramic main body in a width direction is Tc and a thickness of the external electrodes at a lateral edge of a printed surface region of the internal electrodes is T1, $0.5 \leq |T1/Tc| \leq 1.0$ is satisfied.

When a distance from the central portion of the ceramic main body in the width direction to the lateral edge of the printed surface region of the internal electrodes is L, $|Tc-T1|/L \leq 0.02$ may be satisfied.

When a thickness of the thinnest portion of the external electrodes at corners of the ceramic main body is T2, $0.2 \leq |T2/Tc| \leq 1.0$ may be satisfied.

The external electrodes may include 60 wt % or less of a conductive metal with regard to a total weight of a paste therefor.

The conductive metal may include at least one selected from the group consisting of copper (Cu), nickel (Ni), silver (Ag), and silver-palladium (Ag—Pd).

According to another aspect of the present invention, there is provided a multilayer ceramic electronic component including: a ceramic main body; a plurality of internal electrodes laminated within the ceramic main body; and external electrodes formed on outer surfaces of the ceramic main body and electrically connected to the internal electrodes, wherein an average thickness of the external electrodes is 10 µm or less, and when a thickness of the external electrodes in a central portion of the ceramic main body in a width direction is Tc, a thickness of the external electrodes at a lateral edge of a printed surface region of the internal electrodes is T1, and a distance from the central portion of the ceramic main body in the width direction to the lateral edge of the printed surface region of the internal electrodes is L, $|Tc-T1|/L \leq 0.02$ is satisfied.

When a thickness of the thinnest portion of the external electrodes at corners of the ceramic main body is T2, $0.2 \leq |T2/Tc| \leq 1.0$ may be satisfied.

The external electrodes may include 60 wt % or less of a conductive metal with regard to a total weight of a paste therefor.

The conductive metal may include at least one selected from the group consisting of copper (Cu), nickel (Ni), silver (Ag), and silver-palladium (Ag—Pd).

According to another aspect of the present invention, there is provided a multilayer ceramic electronic component including: a ceramic main body; a plurality of internal electrodes laminated within the ceramic main body; and external electrodes formed on outer surfaces of the ceramic main body and electrically connected to the internal electrodes, wherein an average thickness of the external electrodes is 10 µm or less, and when a thickness of the external electrodes in a central portion of the ceramic main body in a width direction is Tc, a thickness of the external electrodes at a lateral edge of a printed surface region of the internal electrodes is T1, a thickness of the thinnest portion of the external electrodes at corners of the ceramic main body is T2, and a distance from the central portion of the ceramic main body in the width direction to the lateral edge of the printed surface region of the internal electrodes is L, $0.5 \leq |T1/Tc| \leq 1.0$, $0.2 \leq |T2/Tc| \leq 1.0$, and $|Tc-T1|/L \leq 0.02$ are satisfied.

The external electrodes may include 60 wt % or less of a conductive metal with regard to a total weight of a paste therefor.

The conductive metal may include at least one selected from the group consisting of copper (Cu), nickel (Ni), silver (Ag), and silver-palladium (Ag—Pd).

According to another aspect of the present invention, there is provided a method of fabricating a multilayer ceramic electronic component, the method including: preparing a ceramic main body including a dielectric layer and a plurality of internal electrodes disposed to face each other, while having the dielectric layer interposed therebetween; preparing a conductive paste for external electrodes including a conductive metal; applying the conductive paste for external electrodes, to end portions of the ceramic main body to be electrically connected to the internal electrodes; and firing the ceramic main body to form external electrodes, wherein an average thickness of the external electrodes is 10 µm or less, and when a thickness of the external electrodes in a central portion of the ceramic main body in a width direction is Tc and a thickness of the external electrodes at a lateral edge of a printed surface region of the internal electrodes is T1, $0.5 \leq |T1/Tc| \leq 1.0$ is satisfied.

When a distance from the central portion of the ceramic main body in the width direction to the lateral edge of the printed surface region of the internal electrodes is L, $|Tc-T1|/L \leq 0.02$ may be satisfied.

When a thickness of the thinnest portion of the external electrodes at corners of the ceramic main body is T2, $0.2 \leq |T2/Tc| \leq 1.0$ may be satisfied.

The conductive metal may include at least one selected from the group consisting of copper (Cu), nickel (Ni), silver (Ag), and silver-palladium (Ag—Pd).

The external electrodes may include 60 wt % or less of a conductive metal with regard to a total weight of the conductive paste.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
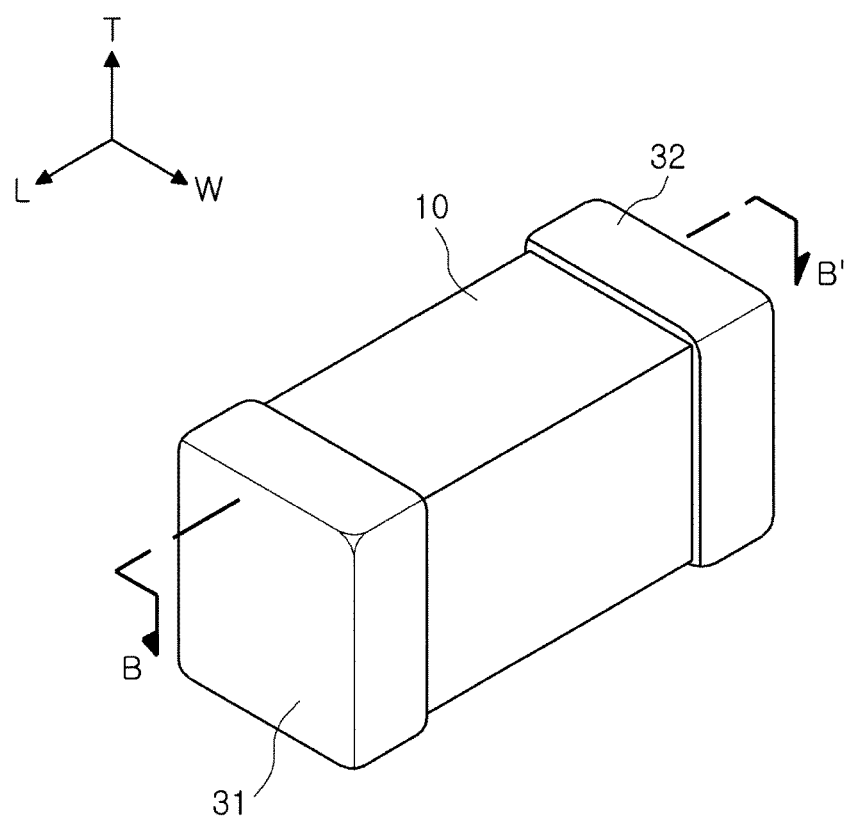
FIG. 1 is a perspective view schematically showing a multilayer ceramic capacitor (MLCC) according to first to third embodiments of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of components may be exaggerated for clarity, and the same reference numerals will be used throughout to designate the same or like components.

FIG. 1 is a perspective view schematically showing a multilayer ceramic capacitor (MLCC) according to first to third embodiments of the present invention.

Figure 2:
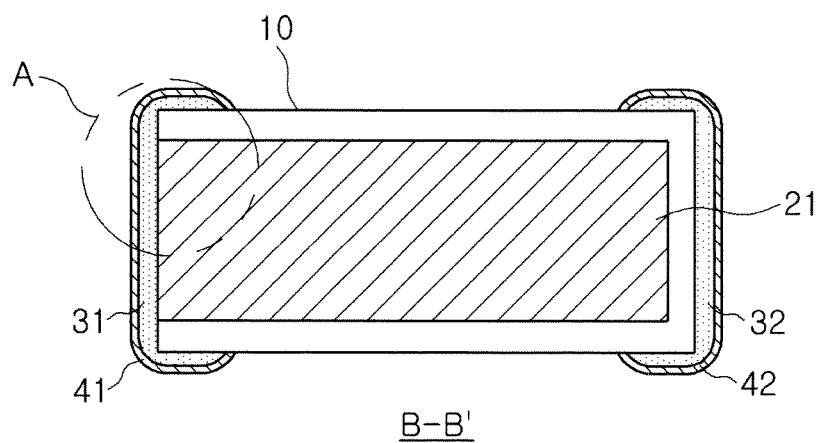
FIG. 2 is a sectional view taken along line B-B' in FIG. 1.

FIG. 2 is a sectional view taken along line B-B' in FIG. 1.

Figure 3:
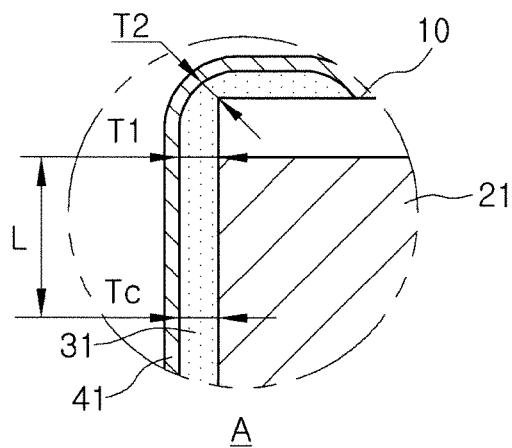
FIG. 3 is an enlarged view of portion 'A' in FIG. 2 according to the first embodiment of the present invention.

FIG. 3 is an enlarged view of portion 'A' in FIG. 2 according to the first embodiment of the present invention.

With reference to FIGS. 1 through 3, a multilayer ceramic electronic component according to the first embodiment of the present invention includes: a ceramic main body 10; a plurality of internal electrodes 21 laminated within the ceramic main body; and external electrodes 31 and 32 formed on outer surfaces of the ceramic main body 10 and electrically connected to the internal electrodes 21. An average thickness of the external electrodes 31 and 32 may be 10 μm or less, and when a thickness of the external electrodes 31 and 32 in a central portion of the ceramic main body 10 in a width direction is Tc and a thickness of the external electrodes 31 and 32 at a lateral edge of a printed surface region of the internal electrodes 21 is T1, $0.5 \leq |T1/Tc| \leq 1.0$ may be satisfied.

When a distance from the central portion of the ceramic main body 10 in the width direction to the lateral edge of the printed surface region of the internal electrode 21 is L, $|Tc-T1|/L \leq 0.02$ may be satisfied.

The external electrodes 31 and 32 may include 60 wt % or less of a conductive metal with regard to a total weight of a paste therefor.

The conductive metal may be one or more selected from the group consisting of copper (Cu), nickel (Ni), silver (Ag), and silver-palladium (Ag—Pd).

Hereinafter, a multilayer ceramic electronic component according to an embodiment of the present invention will be described, and in particular, a multilayer ceramic capacitor (MLCC) will be taken as an example of the multilayer ceramic electronic component but the present invention is not limited thereto.

The ceramic main body 10 is not limited in terms of shape. However, the ceramic main body 10 may have a rectangular parallelepiped shape.

Meanwhile, in the MLCC according to the present embodiment, it is defined that a 'length direction' is the 'L' direction, a 'width direction' is the 'W' direction, and a 'thickness direction' is the 'T' direction in FIG. 1. Here, the 'thickness direction' may be used to have the same concept as a 'lamination direction' in which dielectric layers are stacked.

According to the first embodiment of the present invention, a raw material for forming the ceramic main body 10 is not particularly limited, so long as sufficient capacitance can be obtained. For example, barium titanate ($BaTiO_3$) powder may be used therefor.

As for the material of the ceramic main body 10, various materials such as a ceramic additive, an organic solvent, a plasticizer, a bonding agent, a dispersing agent, or the like, may be added to a powder such as barium titanate ($BaTiO_3$), or the like, according to the purpose of the present invention.

A material for the first and second inner electrodes 21 may not be particularly limited. For example, the inner electrodes 21 may be formed by using a conductive paste made of at least one of silver (Ag), lead (Pb), platinum (Pt), nickel (Ni), and copper (Cu).

The inner electrodes 21 may be alternately laminated within the ceramic main body 10, and adjacent internal electrodes may have opposing polarities.

The MLCC according to the first embodiment of the present invention may include the external electrodes 31 and 32 electrically connected to the internal electrodes 21.

The external electrodes 31 and 32 may be electrically connected to the internal electrodes 21 to form capacitance.

According to the first embodiment of the present invention, an average thickness of the external electrodes 31 and 32 may be 10 μm or less. In a case in which the average thickness exceeds 10 μm, the external electrodes are thick. Accordingly, even in the case that there is a deviation in the thickness of the external electrodes, reliability thereof may not be impaired.

With reference to FIGS. 2 and 3, in a length and width directional (L-W) section of the central portion of the MLCC in the thickness (T) direction, when a thickness of the first and second external electrodes 31 and 32 in the central portion of the ceramic main body 10 in the width direction is Tc and a thickness of the first and second external electrodes at the lateral edge of the printed surface region of the internal electrode 21 is T1, $0.5 \leq |T1/Tc| \leq 1.0$ may be satisfied.

The thickness Tc of the external electrodes 31 and 32 in the central portion of the ceramic main body 10 in the width direction may refer to a thickness of the external electrodes 31 and 32 which is met when a virtual line is drawn in the length direction of the ceramic main body 10 starting from a central point of the ceramic main body 10 in the width direction.

Meanwhile, the thickness T1 of the external electrodes 31 and 32 at the lateral edge of the printed surface region of the internal electrode 21 may refer to a thickness of the external electrodes 31 and 32 which is met when a virtual line is drawn in the length direction of the ceramic main body 10 starting from the lateral edge of the printed surface region.

Since the ratio of |T1/Tc| satisfies 0.5≤|T1/Tc|≤1.0, a deviation between the thickness Tc of the external electrodes 31 and 32 in the central portion of the ceramic main body 10 in the width direction and the thickness T1 of the external electrodes 31 and 32 at the lateral edge of the printed surface region of the internal electrodes 21 can be reduced, thus preventing a degradation of reliability.

In a case in which the ratio of |T1/Tc| is less than 0.5, the deviation in the thickness of the external electrodes 31 and 32 is increased, and accordingly, a plating solution may infiltrate into a thinner portion thereof to degrade reliability.

According to the first embodiment of the present invention, when the thickness of the external electrodes 31 and 32 in the central portion of the ceramic main body 10 in the width direction is Tc and the thickness of the external electrodes 31 and 32 at the lateral edge of the printed surface region of the internal electrode 21 is T1, 0.5|T1/Tc|≤1.0 may be satisfied, and when the distance L from the central portion of the ceramic main body 10 in the width direction to the lateral edge of the printed surface region of the internal electrode 21 is L, |Tc−T1|/L≤0.02 may be satisfied.

The value of |Tc−T1|/L may indicate a degree of flatness of the external electrode regions from the central portion of the ceramic main body 10 in the width direction to the lateral edge of the printed surface region of the internal electrode 21 in the configuration of the external electrodes 31 and 32.

In detail, when the value of |Tc−T1| is increased, the deviation between the thickness Tc of the external electrodes 31 and 32 in the central portion of the ceramic main body 10 in the width direction and the thickness T1 of the external electrodes 31 and 32 at the lateral edge of the printed surface region of the internal electrode 21 may be increased.

Meanwhile, when the value of |Tc−T1| is reduced, the deviation between the thickness Tc of the external electrodes 31 and 32 in the central portion of the ceramic main body 10 in the width direction and the thickness T1 of the external electrodes 31 and 32 at the lateral edge of the printed surface region of the internal electrode 21 may be reduced.

Since the ratio of |Tc−T1|/L satisfies 0.02 or less, the deviation between the thickness Tc of the external electrodes 31 and 32 in the central portion of the ceramic main body 10 in the width direction and the thickness T1 of the external electrodes 31 and 32 at the lateral edge of the printed surface region of the internal electrode 21 is reduced, thus preventing a degradation of reliability.

In a case in which the ratio of |Tc−T1|/L exceeds 0.02, the deviation in the thickness of the external electrodes 31 and 33 is increased, and accordingly, a plating solution may infiltrate through a thinner portion of the external electrodes, potentially degrading reliability.

Figure 4:
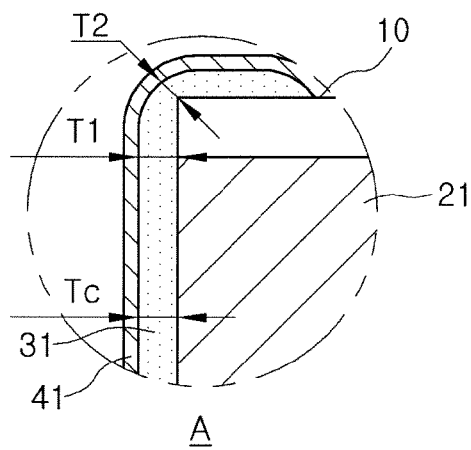
FIG. 4 is an enlarged view of portion 'A' in FIG. 2 according to the second embodiment of the present invention.

FIG. 4 is an enlarged view of portion 'A' in FIG. 2 according to the second embodiment of the present invention.

With reference to FIG. 4, in the multilayer ceramic electronic component according to the second embodiment of the present invention, when the thickness of the external electrodes 31 and 32 in the central portion of the ceramic main body 10 in the width direction is Tc and the thickness of the external electrodes 31 and 32 at the lateral edge of the printed surface region of the internal electrode 21 is T1, 0.5≤|T1/Tc|≤1.0 may be satisfied, and when a thickness of the thinnest portion of the external electrodes 31 and 32 at a corner of the ceramic main body 10 is T2, 0.2≤|T2/Tc|≤1.0 may be satisfied.

The thickness T2 of the thinnest portion of the external electrodes 31 and 32 at the corner of the ceramic main body 10 may refer to the thickness of the thinnest portion of the regions of the external electrodes 31 and 32 formed at the corner of the ceramic main body 10.

Since the ratio of |T2/Tc| satisfies 0.2≤|T2/Tc|≤1.0, a deviation between the thickness Tc of the external electrodes 31 and 32 in the central portion of the ceramic main body 10 in the width direction and the thickness T2 of the thinnest portion of the external electrodes 31 and 32 at the corner of the ceramic main body 10 may be reduced, thereby preventing degradation of reliability.

In a case in which the ratio |T2/Tc| is less than 0.2, the deviation in the thickness of the external electrodes 31 and 32 may be increased to allow a plating solution to infiltrate into a thinner portion, resulting in degradation of reliability.

In order to measure the thickness of the external electrodes 31 and 32, as shown in FIG. 2, the thickness of the external electrodes 31 and 32 may be measured by scanning an image of a cross section of the MLCC in the length direction thereof by using a scanning electron microscope (SEM) as shown in FIG. 2.

In detail, with respect to an external electrode region extracted by scanning an image of a cross section of the MLCC, with the SEM, in a length and width direction (L-W) cut in the central portion thereof in the thickness (T) direction as shown in FIG. 2, a thickness at each point of the external electrode cross-section may be measured.

The external electrodes 31 and 32 may be formed to include a conductive metal identical to that of the internal electrode, but the present invention is not limited thereto. For example, the conductive metal may be at least one metal selected from the group consisting of copper (Cu), nickel (Ni), silver (Ag), and silver-palladium (Ag—Pd).

The external electrodes 31 and 32 may be formed by applying a conductive paste, prepared by adding glass frit to the conductive metal, to the ceramic main body and then firing the same, and plating layers 41 and 42 may be additionally formed on the fired external electrodes 31 and 32.

As mentioned above, in the MLCC according to the first and second embodiments of the present invention, the external electrodes 31 and 32 may include a conductive metal of 60 wt % or less with regard to the total weight of the paste in order to reduce the deviation between the thickness Tc of the external electrodes 31 and 32 in the central portion of the ceramic main body 10 in the width direction and the thicknesses T1 and T2 at the respective points of the external electrodes 31 and 32.

In detail, according to the first and second embodiments of the present invention, since the external electrodes 31 and 32 include the conductive metal of 60 wt %, or less with regard to the total weight of the paste, the thicknesses of the respective points of the external electrodes 31 and 32 satisfy relational expressions of 0.5≤|T1/Tc|≤1.0 and 0.2≤|T2/Tc|≤1.0, and the ratio of |Tc−T1|/L satisfies a relational expression of |Tc−T1|/L≤0.02.

Namely, since the conductive paste used in the forming of the external electrodes 31 and 32 including 60 wt % or less of the conductive metal with regard to the total weight thereof has physical properties of low viscosity, the thickness of the conductive paste applied at the time of forming the external electrodes 31 and 32 is reduced, and therefore, thickness deviations may be reduced.

In a case in which the conductive metal included in the external electrodes 31 and 32 exceeds 60 wt % with regard to the total weight of the conductive paste, viscosity of the conductive paste applied in the forming of the external electrodes 31 and 32 would be increased to cause a failure of reducing reduce the thickness of the applied conductive paste and reducing the thickness deviations, resulting in degradation of reliability.

Meanwhile, since the external electrodes are formed by using the conductive paste having low viscosity, the configuration of the external electrodes may not be uniform, and here, a method for making the configuration of the external electrodes uniform is not particularly limited. For example, a formation of a non-uniform region in the configuration of the external electrodes may be controlled to be minimal by using an organic coating film that can be easily removed to obtain uniform external electrodes.

In the foregoing method, before forming the external electrodes 31 and 32 on the ceramic main body 10, an organic coating film that can be easily removed may be formed on the surface of the ceramic main body 10.

Next, the organic coating film may be removed from a portion of the ceramic main body 10 in which the external electrodes 31 and 32 are to be formed.

Then, a conductive paste may be applied to a surface of the ceramic main body 10 to thereby form the external electrodes 31 and 32.

Finally, the organic coating film may be removed from the surface of the ceramic main body 10 having the external electrodes 31 and 32 formed thereon, thus removing the conductive paste for the external electrodes flowing and attached to the organic coating film from the ceramic main body 10.

Figure 5:
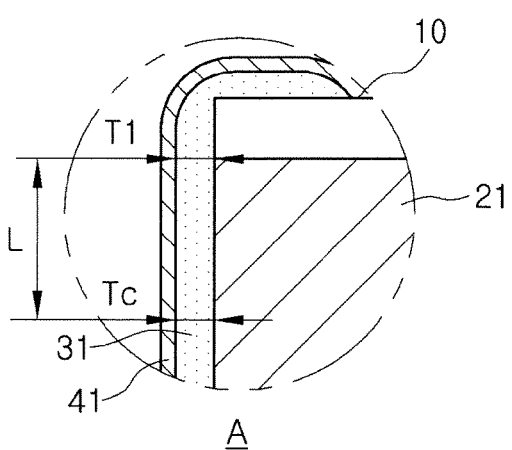
FIG. 5 is an enlarged view of portion 'A' in FIG. 2 according to the third and fourth embodiments of the present invention.

FIG. 5 is an enlarged view of portion 'A' in FIG. 2, according to the third and fourth embodiments of the present invention.

With reference to FIG. 5, the multilayer ceramic electronic component according to the third embodiment of the present invention includes: a ceramic main body 10; a plurality of internal electrodes 21 laminated within the ceramic main body 10; and external electrodes 31 and 32 formed on outer surfaces of the ceramic main body 10 and electrically connected to the internal electrodes 21. An average thickness of the external electrodes 31 and 32 may be 10 μm or less, and when a thickness of the external electrodes 31 and 32 in a central portion of the ceramic main body 10 in the width direction is Tc, a thickness of the external electrodes 31 and 32 at a lateral edge of a printed surface region of the internal electrode 21 is T1, and a distance from the central portion of the ceramic main body 10 in the width direction to the lateral edge of the printed surface region of the internal electrodes 21 is L, $|Tc-T1|/L \leq 0.02$ may be satisfied.

When a thickness of the thinnest portion of the external electrodes 31 and 32 at corners of the ceramic main body 10 is T2, $0.2 \leq |T2/Tc| \leq 1.0$ may be satisfied.

The external electrodes 31 and 32 may include 60 wt % or less of a conductive metal with regard to a total weight of a paste therefor.

The conductive metal may include at least one selected from the group consisting of copper (Cu), nickel (Ni), silver (Ag), and silver-palladium (Ag—Pd).

Description of the same characteristics of the multilayer ceramic electronic component according to the third embodiment of the present invention as those of the multilayer ceramic electronic component according to the first and second embodiments of the present invention will be omitted.

With reference to FIG. 5, the multilayer ceramic electronic component according to the fourth embodiment of the present invention includes: a ceramic main body 10; a plurality of internal electrodes 21 laminated within the ceramic main body 10; and external electrodes 31 and 32 formed on outer surfaces of the ceramic main body 10 and electrically connected to the internal electrodes 21. An average thickness of the external electrodes 31 and 32 may be 10 μm or less. When a thickness of the external electrodes 31 and 32 in a central portion of the ceramic main body 10 in the width direction is Tc, a thickness of the external electrodes 31 and 32 at a lateral edge of a printed surface region of the internal electrodes 21 is T1, a thickness of the thinnest portion of the external electrodes 31 and 32 at corners of the ceramic main body 10 is T2, and a distance from the central portion of the ceramic main body 10 in the width direction to the lateral edge of the printed surface region of the internal electrodes 21 is L, $0.5 \leq |T1/Tc| \leq 1.0$, $0.2 \leq |T2/Tc| \leq 1.0$ and $|Tc-T1|/L \leq 0.02$ may be satisfied.

The external electrodes 31 and 32 may include 60 wt % or less of a conductive metal with regard to a total weight of a paste therefor.

The conductive metal may include at least one selected from the group consisting of copper (Cu), nickel (Ni), silver (Ag), and silver-palladium (Ag—Pd).

Figure 6:
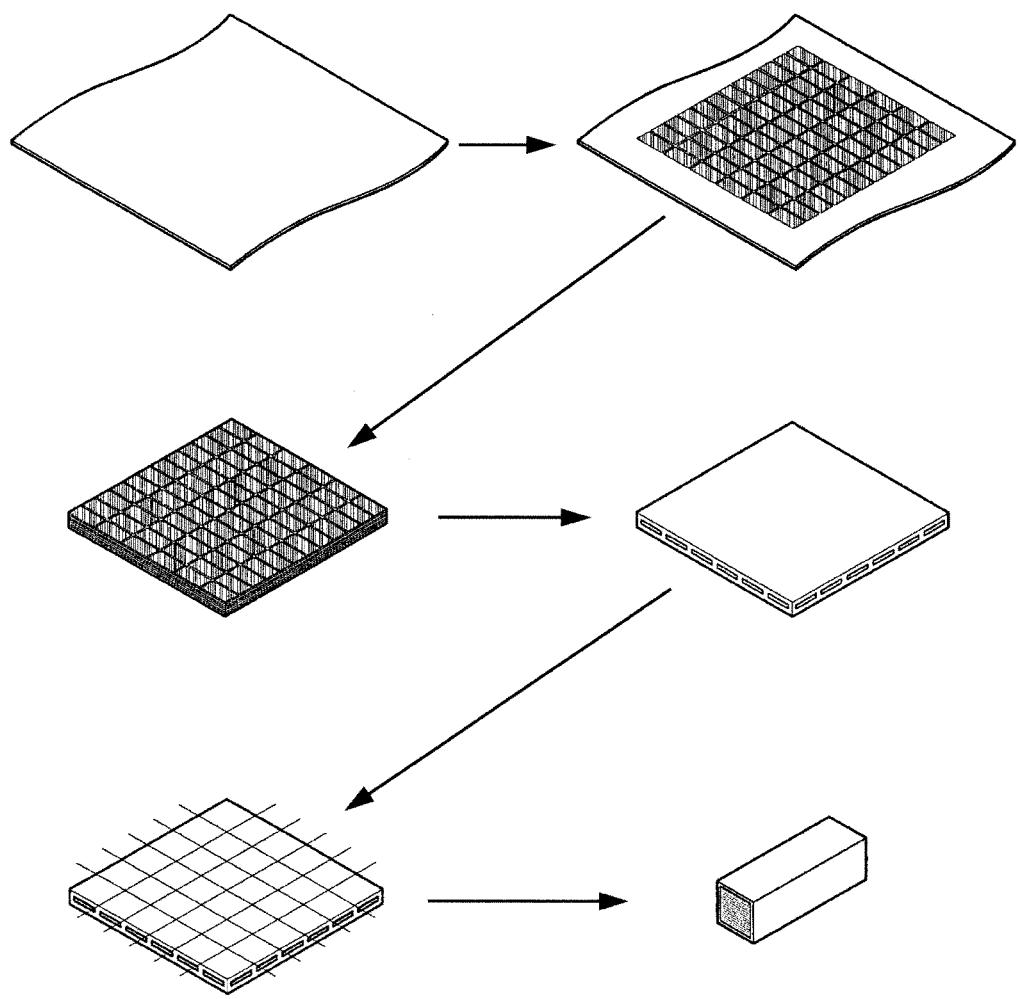
FIG. 6 is a view showing a fabrication process of an MLCC according to a fifth embodiment of the present invention.

FIG. 6 is a view showing a fabrication process of an MLCC according to a fifth embodiment of the present invention.

With reference to FIG. 6, a method of fabricating a multilayer ceramic electronic component according to a fifth embodiment of the present invention includes: preparing a ceramic main body including a dielectric layer and a plurality of internal electrodes disposed to face each other while having the dielectric layer interposed therebetween; preparing a conductive paste for external electrodes, including a conductive metal; applying the conductive paste for external electrodes to end portions of the ceramic main body to be electrically connected to the internal electrodes; and firing the ceramic main body to form external electrodes. An average thickness of the external electrodes is 10 μm or less, and when a thickness of the external electrodes in a central portion of the ceramic main body in a width direction is Tc and a thickness of the external electrodes at a lateral edge of a printed surface region of the internal electrodes is T1, $0.5 \leq |T1/Tc| \leq 1.0$ is satisfied.

In the multilayer ceramic electronic component fabricated according to the method of fabricating a multilayer ceramic electronic component according to the fifth embodiment of the present invention, an average thickness of the external electrodes is 10 μm or less, and when a thickness of the external electrodes in the central portion of the ceramic main body in the width direction is Tc and a thickness of the external electrodes at the lateral edge of the printed surface region of the internal electrodes is T1, $0.5 \leq |T1/Tc| \leq 1.0$ is satisfied.

Thus, the deviation between the thicknesses of the external electrodes is reduced, and even in the case that the external electrodes are thinned, a multilayer ceramic electronic component having excellent reliability can be realized.

The characteristics of the multilayer ceramic electronic component according to the fifth embodiment of the present invention other than the foregoing characteristics are the same as those of the multilayer ceramic electronic components according to the first to fourth embodiments of the present invention and the method of fabricating the multilayer ceramic electronic component according to the fifth embodiment of the present invention is the same as a general fabrication method, so a detailed description thereof will be omitted.

The present invention will be described in more detail through examples; however, the present invention is not limited thereto.

The Examples were performed with regard to a multilayer ceramic capacitor (MLCC) including external electrodes having an average thickness of 10 μm or less in order to test a high temperature accelerated aging and reliability enhancement according to the relationship between the thicknesses Tc, T1, and T2 at respective points of the external electrodes and the value of |Tc−T1|/L.

The MLCC according to the Examples was fabricated through the following operations.

First, slurry, including powder such as barium titanate (BaTiO$_3$), or the like, was applied to carrier films and then dried to prepare a plurality of ceramic green sheets, whereby dielectric layers were formed.

Next, a conductive paste for internal electrodes, including nickel particles having an average size of 0.05 to 0.2 μm, was prepared.

The conductive paste for internal electrodes was applied to the plurality of ceramic green sheets through a screen printing method in order to form internal electrodes, and fifty sheets having the internal electrodes formed thereon were laminated to form a lamination.

Thereafter, the lamination was compressed and cut to generate a chip having a 0603 standard size, and the chip was fired at a temperature ranging from 1050° C. to 1200° C. under a reduced atmosphere of 0.1% or less H$_2$.

Then, external electrodes were formed using a conductive paste for external electrodes including a conductive metal having a content of 60 parts by weight and glass frit, and then subjected to a plating process or the like, to fabricate an MLCC.

Meanwhile, a general MLCC was provided as the Comparative Example and was fabricated in the same manner, except that the ratio of the thicknesses Tc, T1, and T2 at the respective points of the external electrodes and the value of |Tc−T1|/L were outside of the numerical value range defined in the examples of the present invention.

In the following Table 1, reliability was compared according to the average thickness of the external electrodes of the MLCC.

Reliability was determined under the conditions that a temperature of 85° C., humidity of 85%, a voltage of 1.5 Vr were applied, and testing was performed for one hour. O indicates acceptable reliability and X indicates defectivity.

TABLE 1

|  | Average Thickness of External Electrode (μm) | Tc (μm) | T1 (μm) | T2 (μm) | L (μm) | T1/Tc | T2/Tc | |Tc − T1|/L | Determination of Reliability |
| --- | --- | --- | --- | --- | --- | --- | --- | --- | --- |
| *1 | 10 | 10 | 3.5 | 1.1 | 270 | 0.35 | 0.11 | 0.024 | X |
| *2 | 12 | 12 | 2.9 | 0.9 | 270 | 0.24 | 0.08 | 0.034 | ○ |
| *3 | 14 | 14 | 2.9 | 1.8 | 270 | 0.21 | 0.13 | 0.041 | ○ |

With reference to Table 1, the average thickness of the external electrodes was 10 μm in sample 1. When sample 1 is outside of the numerical value range of the present invention, since the average thickness of the external electrode is small, reliability may be problematic.

On the other hand, the average thickness of the external electrode was 10 μm or more in samples 2 and 3. Although samples 2 and 3 are outside of the numerical value range of the present invention, since the average thickness of the external electrode is great, there is no problem with reliability.

Thus, it can be seen that when the average thickness of the external electrodes of the multilayer ceramic electronic component according to an embodiment of the present invention is 10 μm or less, reliability is affected according to whether or not the numerical value range of the present invention is satisfied.

When an average thickness of external electrodes of a chip having a 0603 standard size was 10 μm or less, reliability enhancement according to the ratio of the thicknesses Tc, T1, and T2) at the respective points of the external electrode was compared in Table 2.

TABLE 2

| | Average Thickness of External Electrode (μm) | Tc (μm) | T1 (μm) | T2 (μm) | L (μm) | T1/Tc | T2/Tc | \|Tc − T1\|/L | Determination of Reliability |
|---|---|---|---|---|---|---|---|---|---|
| 4 | 6 | 6 | 3.8 | 1.5 | 270 | 0.63 | 0.25 | 0.008 | ○ |
| 5 | 8 | 8 | 4.6 | 2.3 | 270 | 0.58 | 0.29 | 0.013 | ○ |
| 6 | 10 | 10 | 5.2 | 3.1 | 270 | 0.52 | 0.31 | 0.018 | ○ |
| 7 | 6 | 6 | 3.4 | 1.4 | 270 | 0.57 | 0.23 | 0.010 | ○ |
| 8 | 8 | 8 | 4.2 | 1.9 | 270 | 0.53 | 0.24 | 0.014 | ○ |
| 9 | 10 | 10 | 4.5 | 2.3 | 270 | 0.45 | 0.23 | 0.020 | ○ |
| 10 | 6 | 6 | 3.1 | 1.3 | 270 | 0.52 | 0.22 | 0.011 | ○ |
| 11 | 8 | 8 | 4.3 | 2.1 | 270 | 0.54 | 0.26 | 0.014 | ○ |
| 12 | 10 | 10 | 4.5 | 2.5 | 270 | 0.42 | 0.25 | 0.020 | ○ |
| *13 | 6 | 6 | 2.9 | 0.9 | 270 | 0.48 | 0.15 | 0.011 | X |
| *14 | 8 | 8 | 3.2 | 0.9 | 270 | 0.40 | 0.11 | 0.018 | X |
| *15 | 10 | 10 | 3.5 | 1.1 | 270 | 0.35 | 0.11 | 0.024 | X |
| *16 | 7 | 7 | 3.1 | 0.9 | 270 | 0.44 | 0.13 | 0.014 | X |
| *17 | 9 | 9 | 3.6 | 1.8 | 270 | 0.45 | 0.23 | 0.016 | X |

As can be seen in Table 2, the reliability of samples 4 to 12, i.e., Inventive Examples of the present invention in which the average thickness of the external electrodes was 10 μm or less and the numerical value ranges of $0.5 \leq |T1/Tc| \leq 1.0$, $0.2 \leq |T2/Tc| \leq 1.0$ and $|Tc-T1|/L \leq 0.02$ were satisfied, was enhanced.

On the other hand, in case of samples 13 to 17, i.e., Comparative Examples in which the average thickness of the external electrodes was 10 μm or less and the foregoing numerical value ranges of the present invention were not satisfied, reliability was degraded.

In conclusion, it can be seen that, according to the Inventive Examples, reliability can be enhanced by adjusting the thickness deviations at the respective points of the external electrodes.

In detail, a high capacitance multilayer ceramic electronic component having excellent reliability can be realized by the external electrodes formed to satisfy the numerical value ranges of $0.5 \leq |T1/Tc| \leq 1.0$, $0.2 \leq |T2/Tc| \leq 1.0$ and $|Tc-T1|/L \leq 0.02$.

As set forth above, according to embodiments of the invention, a high capacitance multilayer ceramic electronic component having excellent reliability can be realized by reducing thickness deviations in external electrodes thereof although it has thinned external electrodes.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic main body;
a plurality of internal electrodes laminated within the ceramic main body; and
external electrodes formed of a conductive paste formed on outer surfaces of the ceramic main body and electrically connected to the internal electrodes,
wherein an average thickness of the external electrodes is 10 μm or less, and
when a thickness of the external electrodes in a central portion of the ceramic main body in a width direction is Tc and a thickness of the external electrodes at a lateral edge of a printed surface region of the internal electrodes is T1, $0.5 \leq |T1/Tc| \leq 1.0$ is satisfied.

2. The multilayer ceramic electronic component of claim 1, wherein, when a distance from the central portion of the ceramic main body in the width direction to the lateral edge of the printed surface region of the internal electrodes is L, $|Tc-T1|/L \leq 0.02$ is satisfied.

3. The multilayer ceramic electronic component of claim 1, wherein, when a thickness of the thinnest portion of the external electrodes at corners of the ceramic main body is T2, $0.2 \leq |T2/Tc| \leq 1.0$ is satisfied.

4. The multilayer ceramic electronic component of claim 1, wherein the external electrodes include 60 wt % or less of a conductive metal with regard to a total weight of the paste therefor.

5. The multilayer ceramic electronic component of claim 4, wherein the conductive metal includes at least one selected from the group consisting of copper (Cu), nickel (Ni), silver (Ag), and silver-palladium (Ag—Pd).

6. A multilayer ceramic electronic component comprising:
a ceramic main body;
a plurality of internal electrodes laminated within the ceramic main body; and
external electrodes formed of a conductive paste formed on outer surfaces of the ceramic main body and electrically connected to the internal electrodes,
wherein an average thickness of the external electrodes is 10 μm or less, and
when a thickness of the external electrodes in a central portion of the ceramic main body in a width direction is Tc, a thickness of the external electrodes at a lateral edge of a printed surface region of the internal electrodes is T1, and a distance from the central portion of the ceramic main body in the width direction to the lateral edge of the printed surface region of the internal electrodes is L, $|Tc-T1|/L \leq 0.02$ is satisfied.

7. The multilayer ceramic electronic component of claim 6, wherein, when a thickness of the thinnest portion of the external electrodes at corners of the ceramic main body is T2, $0.2 \leq |T2/Tc| \leq 1.0$ is satisfied.

8. The multilayer ceramic electronic component of claim 6, wherein the external electrodes include 60 wt % or less of a conductive metal with regard to a total weight of the paste therefor.

9. The multilayer ceramic electronic component of claim 8, wherein the conductive metal includes at least one selected from the group consisting of copper (Cu), nickel (Ni), silver (Ag), and silver-palladium (Ag—Pd).

10. A multilayer ceramic electronic component comprising:
- a ceramic main body;
- a plurality of internal electrodes laminated within the ceramic main body; and
- external electrodes formed of a conductive paste formed on outer surfaces of the ceramic main body and electrically connected to the internal electrodes,
- wherein an average thickness of the external electrodes is 10 μm or less, and
- when a thickness of the external electrodes in a central portion of the ceramic main body in a width direction is Tc, a thickness of the external electrodes at a lateral edge of a printed surface region of the internal electrodes is T1, a thickness of the thinnest portion of the external electrodes at corners of the ceramic main body is T2, and a distance from the central portion of the ceramic main body in the width direction to the lateral edge of the printed surface region of the internal electrodes is L, $0.5 \leq |T1/Tc| \leq 1.0$, $0.2 \leq |T2/Tc| \leq 1.0$, and $|Tc-T1|/L \leq 0.02$ are satisfied.

11. The multilayer ceramic electronic component of claim 10, wherein the external electrodes include 60 wt % or less of a conductive metal with regard to a total weight of the paste therefor.

12. The multilayer ceramic electronic component of claim 10, wherein the conductive metal includes at least one selected from the group consisting of copper (Cu), nickel (Ni), silver (Ag), and silver-palladium (Ag—Pd).

13. A method of fabricating a multilayer ceramic electronic component, the method comprising:
- preparing a ceramic main body including a dielectric layer and a plurality of internal electrodes disposed to face each other, while having the dielectric layer interposed therebetween;
- preparing a conductive paste for external electrodes including a conductive metal;
- applying the conductive paste for external electrodes, to end portions of the ceramic main body to be electrically connected to the internal electrodes; and
- firing the ceramic main body to form external electrodes,
- wherein an average thickness of the external electrodes is 10 μm or less, and
- when a thickness of the external electrodes in a central portion of the ceramic main body in a width direction is Tc and a thickness of the external electrodes at a lateral edge of a printed surface region of the internal electrodes is T1, $0.5 \leq |T1/Tc| \leq 1.0$ is satisfied.

14. The method of claim 13, wherein, when a distance from the central portion of the ceramic main body in the width direction to the lateral edge of the printed surface region of the internal electrodes is L, $|Tc-T1|/L \leq 0.02$ is satisfied.

15. The method of claim 13, wherein when a thickness of the thinnest portion of the external electrodes at corners of the ceramic main body is T2, $0.2 \leq |T2/Tc| \leq 1.0$ is satisfied.

16. The method of claim 13, wherein the conductive metal includes at least one selected from the group consisting of copper (Cu), nickel (Ni), silver (Ag), and silver-palladium (Ag—Pd).

17. The method of claim 13, wherein the external electrodes include 60 wt % or less of a conductive metal with regard to a total weight of the conductive paste.

* * * * *